United States Patent [19]
Bayer

[11] 3,823,327
[45] July 9, 1974

[54] ARRANGEMENT FOR SYMMETRICALLY DISTRIBUTION LOAD TO ELECTRICAL MACHINES OPERATED IN PARALLEL

[75] Inventor: Karl-Heinz Bayer, Erlangen, Germany

[73] Assignee: Siemens Aktiengesellschaft, Munich, Germany

[22] Filed: Dec. 18, 1972

[21] Appl. No.: 315,865

[30] Foreign Application Priority Data
Dec. 21, 1971 Germany............................ 2163397

[52] U.S. Cl..................................... 307/58, 307/87
[51] Int. Cl............................................ H02j 1/10
[58] Field of Search............ 307/52, 53, 57, 58, 82, 307/84, 85, 87

[56] References Cited
UNITED STATES PATENTS

| | | | |
|---|---|---|---|
| 2,829,278 | 4/1958 | Flugstad............................ | 307/87 X |
| 2,872,591 | 2/1959 | Stineman.......................... | 307/84 X |
| 3,185,857 | 5/1965 | Johnson............................ | 307/84 X |
| 3,217,171 | 11/1965 | Corey................................ | 307/87 |
| 3,621,365 | 11/1971 | Beck et al......................... | 307/87 X |
| 3,675,037 | 7/1972 | Hamilton.......................... | 307/82 X |

Primary Examiner—William M. Shoop, Jr.
Attorney, Agent, or Firm—Kenyon & Kenyon Reilly Carr & Chapin

[57] ABSTRACT

An arrangement is disclosed for symmetrically distributing load to parallel operated electrical machines such as direct-current to alternating current converters, inverters of an interruption-free power supply installation or the like. A plurality of current controllers corresponding to respective ones of the machines is provided. Each controller has at least two inputs for respectively receiving an actual value signal indicative of the actual machine current of the corresponding electrical machine and a reference signal indicative of the mean value of the individual actual machine currents. An improvement of the stability is thereby achieved, particularly when individual machines are connected and disconnected during operation. Automatic monitoring and equipment for disconnecting faulty machines without interruption of the current supply to the consumer can also be provided.

5 Claims, 2 Drawing Figures

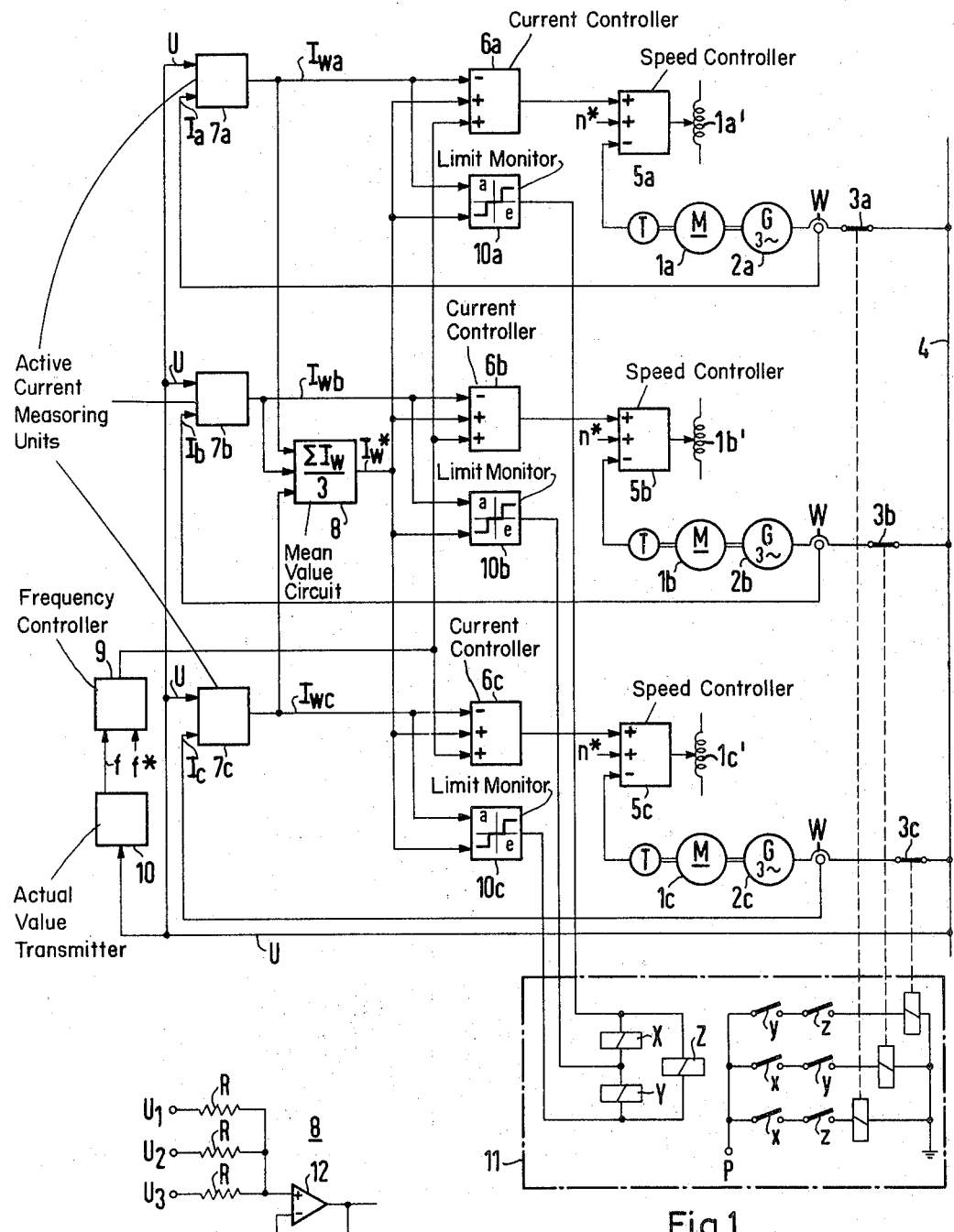
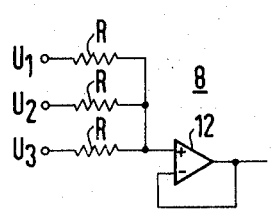
Fig.2
Fig.1

ARRANGEMENT FOR SYMMETRICALLY DISTRIBUTION LOAD TO ELECTRICAL MACHINES OPERATED IN PARALLEL

BACKGROUND OF THE INVENTION

The invention relates to an arrangement for symmetrically distributing load to electric machines operating in parallel. One principle application of the invention is where uniform participation of the machines is to be brought about automatically in the simplest possible and reliable manner and particularly if the number of machines operating in parallel changes in operation.

SUMMARY OF THE INVENTION

It is an object of the invention to provide an arrangement for symmetrically distributing load to electrical machines operated in parallel. Subsidiary to this object, it is an object of the invention to provide an improvement in stability especially when individual machines are connected or disconnected during operation.

The arrangement of the invention symmetrically distributes load to parallel operated electrical machines such as direct-current to alternating current converters, inverters of an interruption-free power supply installation and the like. The electrical machines supply respective machine currents. The arrangement includes as a feature mean value forming means for forming an output reference signal indicative of the mean value of the individual actual machine currents of the machines operating in parallel. A plurality of current controllers correspond to respective ones of the machines and each of the controllers has at least two inputs for respectively receiving an actual value signal indicative of the actual machine current of the corresponding electrical machine and the reference signal.

According to a subsidiary feature, the mean value forming means can include an operational amplifier connected as an impedance transformer. The operational amplifier has an input circuit which includes resistors of like value for receiving respective voltages proportional to the respective actual machine currents of the electrical machines. Internal switching within the mean value forming means becomes thereby unnecessary when the number of the machines operating in parallel changes.

As mentioned above, the arrangement of the invention is applicable where the electrical machines are rotary direct-current to alternating current converters. The converters can supply voltage and current to an output line. It is then another feature of the invention to provide each of the current controllers with an additional input and the arrangement can include a frequency controller common to all of the current controllers for providing the same at the additional inputs thereof with a frequency signal indicative of the difference between a reference frequency and the actual frequency of the voltage supplied to the output line. A plurality of speed controllers corresponding to respective ones of the direct-current machines of the converters is also provided. The current controllers have respective outputs connected to corresponding ones of the speed controllers for supplying the same with respective correction reference values.

According to still another feature, a plurality of disconnect switches corresponding to respective ones of the converters serve to connect the converters to the output line. A plurality of limit monitors corresponding to respective ones of the converters is provided. Each of the monitors is responsive to the difference of the reference signal of the mean value forming means and the actual converter current of the corresponding converter for providing an output signal when this difference exceeds a predetermined limit. Logic circuit means evaluates the output signals of the limit monitors to detect a possible faulty converter and then actuates the corresponding one of the disconnect switches to disconnect the faulty converter from the output line.

Although the invention is illustrated and described herein as an arrangement for symmetrically distributing load to electrical machines operated in parallel, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 1 is an electrical schematic block diagram of a preferred embodiment of the arrangement according to the invention for symmetrically distributing load to electrical machines operated in parallel.

FIG. 2 is an electrical schematic diagram of the mean value former which constitutes a part of the arrangement of FIG. 1. The mean value former provides a reference signal indicative of the mean value of the individual actual machine currents.

DESCRIPTION OF THE PREFERRED EMBODIMENTS OF THE INVENTION

FIG. 1 shows a load distribution control for parallel operation of several rotary direct-current three-phase converters as can be used, for example, in a protected three-phase power supply system of a radio station. Three three-phase generators $2a$, $2b$ and $2c$ driven by direct-current motors $1a$, $1b$ and $1c$ feed a common three-phase bus-bar 4 via disconnect switches $3a$, $3b$ and $3c$. The three-phase generators $2a$, $2b$ and $2c$ are constructed as constant-voltage generators and their exciter windings, not shown, are advantageously connected in parallel; this connection achieves a symmetrical division of the reactive power. With converter motors $1a$, $1b$ and $1c$, there are provided associated speed controllers $5a$, $5b$ and $5c$ respectively. Each speed controller receives its actual value by a tachometer generator T coupled with the corresponding motor. The control deviation between a present reference value n* and the actual value of the speen $n$, formed in the speed controllers, acts after suitable amplification and via a control element, not shown, on the excitation current of the direct-current motors $1a$, $1b$ and $1c$, the excitation windings of these motors being represented by coils $1a'$, $1b'$ and $1c'$ respectively.

Active-current controllers $6a$, $6b$ and $6c$ are superimposed on the speed controllers $5a$, $5b$ and $5c$ respectively in such a manner that their output signals supply additional correction reference values to the respective speed controllers connected in cascade therewith. The actual values $I_{wa}$, $I_{wb}$ and $I_{wc}$ fed to the active-current controllers $6a$, $6b$ and $6c$ are determined in active-current measuring units $7a$, $7b$ and $7c$, which are acted upon on the input side by the bus-bar voltage U and the currents $I_a$, $I_b$ and $I_c$; these currents correspond to the generators 2a, 2b and 2c respectively and are obtained by means of corresponding current transformers W associated with the generators. The active-current measuring units 7a, 7b, 7c can consist of ring modulator circuits which deliver, via suitable smoothing elements, the active component of the generator currents as analog directcurrent output signals $I_{wa}$, $I_{wb}$ and $I_{wc}$. The output signals of the active-current measuring units 7a, 7b and 7c are furthermore fed additively to the input of a mean-value former 8, whose output signal $I_w{}^*$ corresponds to one-third of the active load current because the active load current consists of the sum of the individual active generator currents. The output signal $I_w{}^*$ of the mean-value former 8 serves as reference value for the three active-current controllers 6a, 6b and 6c. In this manner each active-current controller will operate in the direction to achieve the condition that the active generator current assigned to the controller corresponds exactly to the mean value of all the converter units participating in the parallel operation. Great accuracy in the load distribution is assured thereby, and the additional advantage is obtained that, if further converter units are connected or disconnected, any adjusting or resetting of the reference value to be fed to the individual active-current controller becomes unnecessary. With the switching in or out of further converter units, corresponding further input quantities to or from the mean-value former 8 are connected or disconnected.

Because the active-current controllers are superimposed on the speed controllers and the motor excitations are thereby regulated to the required consumer load power or the active load current alone, the speed level which adjusts itself would not be defined per se. For this reason, a frequency controller 9 is provided which acts additionally on the reference-value inputs of all active-current controllers. Because the frequency deviations which this controller circuit is to regulate take place in general only very slowly, only very low control speed is required at this circuit. Rapid changes of speed, however, which are caused by the connecting and disconnecting of loads or by changes of the motor supply voltages, are regulated primarily by the subordinated speed controller, the frequency controller hardly being excited thereby. The actual frequency value $f$ of the busbar voltage U which frequency is to be compared in the frequency controller 9 with the frequency reference value $f^*$, is formed in an actual-value transmitter 10, where, for example, the zero crossings of this voltage can be determined, converted into a pulse sequence, and then delivered by means of a frequency-voltage converter as the corresponding frequency-proportional output voltage $f$.

For monitoring the correct operation of the individual, parallel-operating converter units, three limit monitors in the form of three-level switches 10a, 10b and 10c are provided. These switches are acted upon on the input side by the difference of the output signal $I_w{}^*$ delivered by the mean-value former 8, that is, one-third of the total active load current, and the corresponding actual active-current value of the individual generator. These three-level switches have the relationship between their resultant input quantity $e$ and their output quantity $a$ as shown in the respective block symbols thereof designated 10a, 10b, 10c. If the input quantity exceeds a given limit in the one or the other polarity direction, the output quantity $a$ assumes a constant potential of corresponding polarity. This limit can be chosen, for example, as 10 percent of the nominal current. The output signals of the three-level switches 10a, 10b and 10c are fed to a logic circuit 11 which determines which converter is not operating in conformance with the remaining converters. For example, should the converter unit 1a, 2a, deliver less than one-third of the total consumed load because of a speed control 5a that has become defective, the converters 1b, 2b and 1c, 2c must absorb correspondingly greater loads. If this difference is appreciable, it causes the three-level switches to respond in a manner that a positive potential appears at the output of the three-level switch 10a, while the outputs of the other two limited monitors associated with the undisturbed converters, 10b and 10c, would show a negative potential. The converter unit which acts faulty, that is, not in the same sense as the others, can therefore be recognized and disconnected from the common bus-bar 4. It is advisable to delay the signal releasing the disconnect action by a given amount of time, in order to prevent unnecessary switching in the event of asymmetries which are only transient.

In FIG. 1 is further shown, by way of an example, an embodiment of the logic circuit which functions in the manner described above. It consists of three relays X, Y and Z, the coils of which are respectively connected with the outputs of two three-level switches. The contacts of these relays are correspondingly designated $x$, $y$ and $z$. These contacts are apportioned so that two contacts are serially connected with each actuating coil of the disconnects 3a, 3b and 3c and with the supply voltage P. In the case of the disturbance described above, in which the output voltage of the three-level switch 10a therefore has a positive potential and the outputs of the other two three-level switches a negative potential, or zero potential after the control action by the active-current controllers 6b and 6c is completed, the relays X and Z would therefore pull up and thereby actuate the disconnect switch 3a and thus separate the converter unit operating improperly from the bus-bar 4.

The principle of fault monitoring and disconnecting discussed above can be extended without difficulty to any number of converter units operating in parallel. In that case, the output of each three-level switch would then have to be connected with the outputs of all other three-level switches via a relay coil, which for $n$ converter units would require $(n/2)(n-1)$ relays, and the make contacts of $(n-1)$ relays would have to be arranged in series with the individual excitation coils for the corresponding disconnect switches.

FIG. 2 shows a preferred embodiment of the mean-value former designated with reference numeral 8 in FIG. 1. It consists of an operational amplifier 12, which is connected as an impedance transformer, and whose output voltage is therefore negatively fed back directly to its input. The input of the operational amplifier 12 is designated with a plus sign (+) and is connected to three voltages $U_1$, $U_2$ and $U_3$ via equal resistors R. As the input impedance of the operational amplifier is practically infinite, a voltage of the magnitude (one-third)$(U_1 + U_2 + U_3)$ appears in good approximation at the common junction of the three resistors R and therefore, also at the output of the amplifer, that is, the mean of the input voltages.

In its application, the invention is not limited to rotary machines, as shown in the illustrated embodiment. It can also serve to obtain a load division for inverters that operate in parallel. Such inverters are used, for example, in interruption-free power supply systems.

What is claimed is:

1. An arrangement for symetrically distributing the load of parallel operated electrical machines such as direct current to alternating current converters, inverters of an interruption-free power supply installation and the like comprising;
   a. means associated with each electrical machine for developing an output representing the actual current being provided out of the machine;
   b. means having as inputs all of the outputs representing said machine actual currents for forming an output representative of the mean value of said currents; and
   c. a plurality of means for controlling the current of said machines each associated with a respective machine and each having as one input said output representing the actual current of said machine and as a second input the output of said means for forming said mean value.

2. The arrangement of claim 1, said mean value forming means comprising an operational amplifier connected as an impedance transformer, said amplifier having an input circuit including resistors of like value for receiving respective voltages proportional to the respective actual machine currents of the electrical machines.

3. The arrangement of claim 1 wherein the electrical machines are rotary direct-current to alternating current converters for supplying a voltage and current to an output line and wherein said current controllers each have an additional input, the arrangement comprising a frequency controller common to all of said current controllers for providing the same at the additional inputs thereof with a frequency signal indicative of the difference between a reference frequency and the actual frequency of the voltage supplied to the output line, and a plurality of speed controllers corresponding to respective ones of the direct-current machines of the converters, said current controllers having respective outputs connected to corresponding ones of said speed controllers for supplying the same with respective correction reference values.

4. The arrangement of claim 3 comprising a plurality of disconnect switches corresponding to respective ones of the converters for connecting the converters to the output line, a plurality of limit monitors corresponding to respective ones of the converters, each of said monitors being responsive to the difference of said reference signal of said mean value forming means and the actual converter current of the corresponding converter for providing an output signal when said difference exceeds a predetermined limit, and logic circuit means for evaluating said output signals of said monitors to detect a possible faulty converter and for then actuating the corresponding one of said disconnect switches to disconnect the faulty converter from the output line.

5. The arrangement of claim 4 for n converter units operating in parallel to supply voltage and current to the output line, said logic circuit means comprising voltage supply means, and $(n/2)$ times $(n-1)$ relays having respective actuating coils corresponding to respective ones of said disconnect switches, the outputs of said limit monitors being apportioned so that the output of each limit monitor forms together with the output of at least one other limit monitor on output pair so as to form $(n/2)$ times $(n-1)$ output pairs, said actuating coils being connected to respective ones of said pairs, each of said relays having a plurality of pairs of make contacts, each one of said actuating coils being serially connected to said voltage supply means through a series connection consisting of a pair of contacts from each of the other $(n-1)$ relays.

* * * * *